(12) United States Patent
Slater

(10) Patent No.: US 10,970,569 B2
(45) Date of Patent: Apr. 6, 2021

(54) SYSTEMS AND METHODS FOR MONITORING TRAFFIC LIGHTS USING IMAGING SENSORS OF VEHICLES

(71) Applicant: Toyota Motor North America, Inc., Plano, TX (US)

(72) Inventor: Robert D. Slater, Murphy, TX (US)

(73) Assignee: TOYOTA MOTOR NORTH AMERICA, INC., Plano, TX (US)

( * ) Notice: Subject to any disclaimer, the term of this patent is extended or adjusted under 35 U.S.C. 154(b) by 198 days.

(21) Appl. No.: 16/194,644

(22) Filed: Nov. 19, 2018

(65) Prior Publication Data
US 2020/0160072 A1    May 21, 2020

(51) Int. Cl.
| | | |
|---|---|---|
| G06K 9/00 | (2006.01) | |
| G06T 7/00 | (2017.01) | |
| G08G 1/13 | (2006.01) | |
| G06T 7/12 | (2017.01) | |
| G08G 1/095 | (2006.01) | |
| G05D 1/00 | (2006.01) | |

(52) U.S. Cl.
CPC ....... *G06K 9/00825* (2013.01); *G05D 1/0088* (2013.01); *G06T 7/12* (2017.01); *G08G 1/095* (2013.01); *G08G 1/13* (2013.01); *G06T 2207/30252* (2013.01)

(58) Field of Classification Search
CPC ............ G06K 9/00825; G06K 9/00818; G06T 2207/30252; G08G 1/095; G05D 1/0088; G05D 1/0027; G05D 1/0285
See application file for complete search history.

(56) References Cited

U.S. PATENT DOCUMENTS

| | | |
|---|---|---|
| 8,547,251 B2 | 10/2013 | Goudy et al. |
| 9,928,739 B2 | 3/2018 | Witte et al. |
| 9,947,219 B2 | 4/2018 | Rolle et al. |

(Continued)

FOREIGN PATENT DOCUMENTS

| | | |
|---|---|---|
| DE | 102016210071 A1 | 12/2017 |
| WO | 2017153979 A1 | 9/2017 |

OTHER PUBLICATIONS

"Safety Shield by Cooperative ITS", Online Article, Aug. 28, 2018. URL: https://www.nissan-global.com/EN/TECHNOLOGY/OVERVIEW/vii.html.

(Continued)

*Primary Examiner* — Siamak Harandi
*Assistant Examiner* — Guy Kouaho
(74) *Attorney, Agent, or Firm* — Dinsmore & Shohl LLP

(57) ABSTRACT

A traffic light monitoring system includes a vehicle. The vehicle includes an imaging sensor configured to capture images, one or more processors, one or more memory modules, and machine readable instructions stored in the one or more memory modules that cause the vehicle to perform at least the following when executed by the one or more processors: identify a traffic light based on the images, determine a first transition time when a first light of a traffic light turns off and a second light of the traffic light turns on based on the images, determine a second transition time when the second light of the traffic light turns off and a third light of the traffic light turns on based on the images, and transmit information about the first transition time and the second transition time to an edge computing device.

19 Claims, 8 Drawing Sheets

(56) References Cited

U.S. PATENT DOCUMENTS

| | | | |
|---|---|---|---|
| 10,181,264 B2* | 1/2019 | MacNeille et al. | G08G 1/161 |
| 2008/0253615 A1* | 10/2008 | Kubota et al. | G06K 9/00 |
| | | | 382/104 |
| 2011/0182473 A1 | 7/2011 | Wang | |
| 2018/0114077 A1 | 4/2018 | Ferguson et al. | |
| 2018/0190116 A1 | 7/2018 | Bauer et al. | |

OTHER PUBLICATIONS

Behrang Asadi & Ardalan Vahidi, "Predictive Use of Traffic Signal State for Fuel Saving", Online Article, Sep. 2009. URL: https://www.sciencedirect.com/science/article/pii/S1474667016318389.

\* cited by examiner

SYSTEMS AND METHODS FOR MONITORING TRAFFIC LIGHTS USING IMAGING SENSORS OF VEHICLES

TECHNICAL FIELD

The present specification generally relates to systems and methods for monitoring traffic lights and, more specifically, to systems and methods for monitoring traffic lights using imaging sensors of vehicles and edge computing devices.

BACKGROUND

Traffic lights control the flow of traffic on roads. In many instances, drivers of vehicles have limited information about when the light of a traffic light will change. For example, drivers of vehicles may not know in advance when a green light is going to change to yellow or when a yellow light is going to change to red, etc. In this regard, a driver of a vehicle close to an intersection may need to press a brake abruptly when the driver sees the traffic light changing from green to yellow. Accordingly, a traffic light monitoring system that provides information about upcoming traffic light changes is needed.

SUMMARY

In one embodiment, a traffic light monitoring system includes a vehicle. The vehicle includes an imaging sensor configured to capture images, one or more processors, one or more memory modules, and machine readable instructions stored in the one or more memory modules that cause the vehicle to perform at least the following when executed by the one or more processors: identify a traffic light based on the images, determine a first transition time when a first light of a traffic light turns off and a second light of the traffic light turns on based on the images, determine a second transition time when the second light of the traffic light turns off and a third light of the traffic light turns on based on the images, and transmit information about the first transition time and the second transition time to an edge computing device.

In another embodiment, an edge computing device for monitoring traffic light is provided. The edge computing device includes one or more processors, one or more memory modules, and machine readable instructions stored in the one or more memory modules that cause the edge computing device to perform at least the following when executed by the one or more processors: receive a first transition time when a first light of a traffic light turns off and a second light of the traffic light turns on from a vehicle; receive a second transition time when the second light of the traffic light turns off and a third light of the traffic light turns on from the vehicle; calculate a period for the second light being on based on the first transition time and the second transition time; receive another transition time when the first light turns off and the second light turns on from another vehicle, the another transition time being after the first transition time; and broadcast a notification of an upcoming change of the second light based on the another transition time, the period, and a current time.

In yet another embodiment, an edge computing device for monitoring a traffic light is provided. The edge computing device includes one or more processors, one or more memory modules, and machine readable instructions stored in the one or more memory modules that cause the vehicle to perform at least the following when executed by the one or more processors: receive a first transition time when a first light of a traffic light turns off and a second light of the traffic light turns on from a first vehicle; receive a second transition time when the second light of the traffic light turns off and a third light of the traffic light turns on from a second vehicle; calculate a period for the second light being on based on the first transition time and the second transition time; receive a third transition time when the first light turns off and the second light turns on from a third vehicle, the third transition time being after the first transition time; and broadcast a notification of an upcoming change of the second light based on the third transition time, the period, and a current time.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 2:
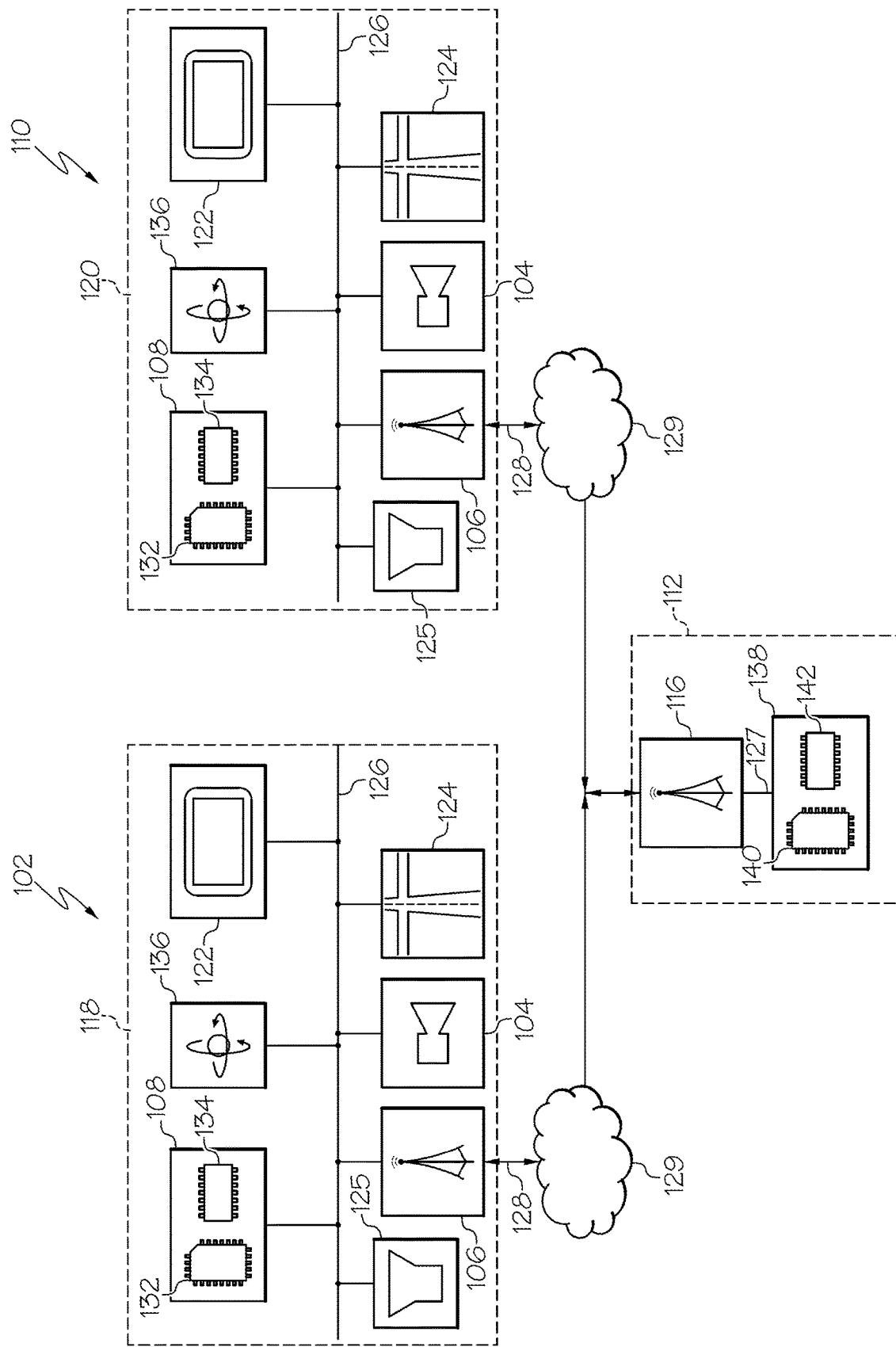
FIG. 2 depicts a schematic illustration of various components of a system for monitoring traffic lights, according to one or more embodiments shown and described herein.

FIG. 2 generally depicts one embodiment of a traffic light monitoring system using imaging sensors of vehicles. The traffic light monitoring system includes an edge computing device and a vehicle. The vehicle includes an imaging sensor configured to capture images, one or more processors, one or more memory modules, and machine readable instructions stored in the one or more memory modules that cause the vehicle to perform at least the following when executed by the one or more processors: identify a traffic light based on the images, determine a first transition time when a first light of a traffic light turns off and a second light of the traffic light turns on based on the images, determine a second transition time when the second light of the traffic light turns off and a third light of the traffic light turns on based on the images, and transmit information about the first transition time and the second transition time to the edge computing device. Various embodiments of the systems and methods for monitoring traffic lights are described in greater detail herein.

Figure 1A:
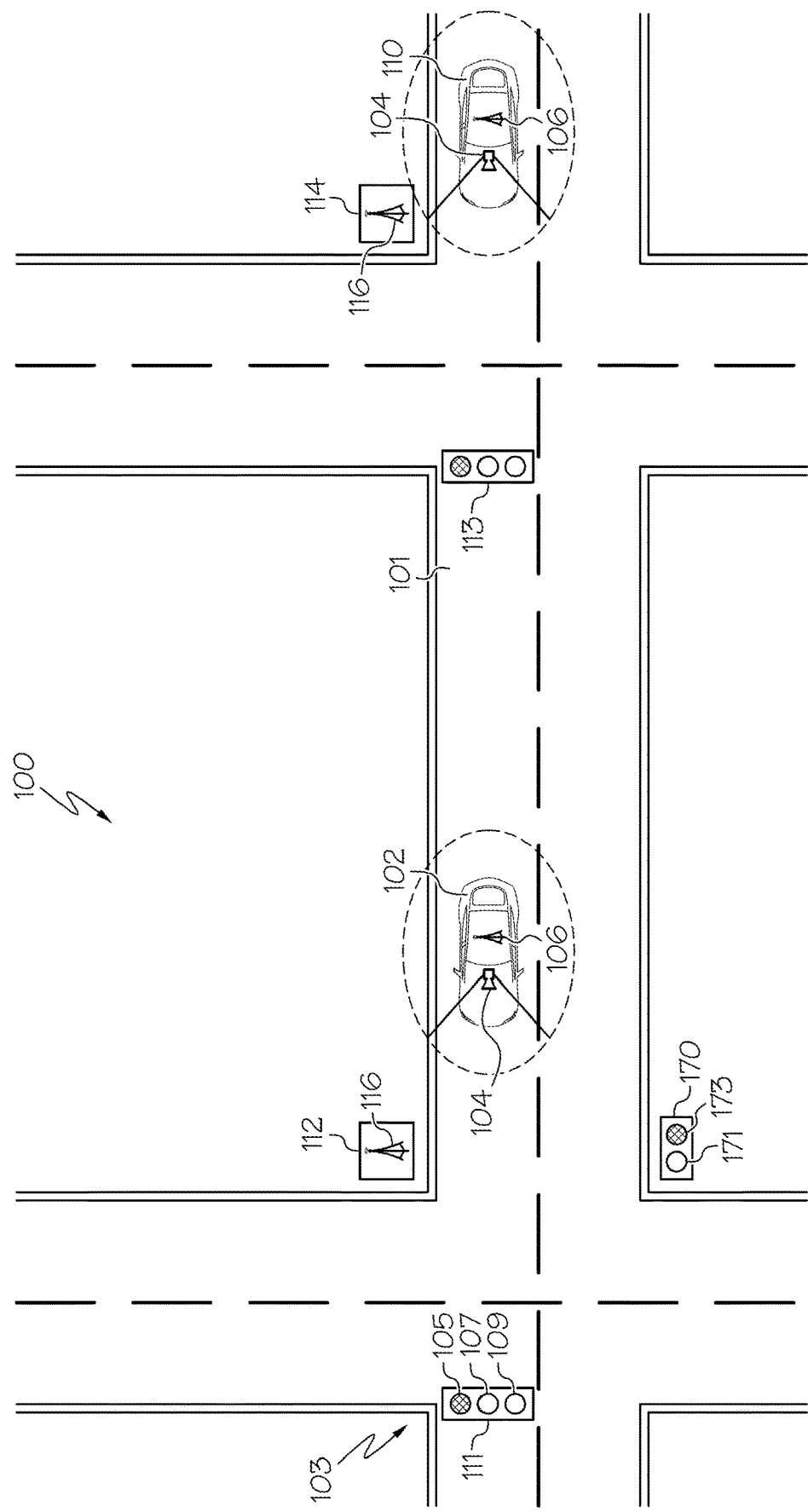
FIG. 1A depicts a scenario in which a traffic light is monitored by imaging sensors of vehicles, according to one or more embodiments shown and described herein.

Referring now to FIG. 1A, a system 100 for monitoring traffic lights is depicted. FIG. 1 depicts a first vehicle 102 and a second vehicle 110 on a roadway 101. The first vehicle 102 or the second vehicle 110 may be an automobile or any other passenger or non-passenger vehicle such as, for example, a terrestrial, aquatic, and/or airborne vehicle. In some embodiments, the first vehicle 102 or the second vehicle 110 is an autonomous vehicle that navigates its environment with limited human input or without human input. The first vehicle 102 and the second vehicle 110 are approaching an intersection 103. A traffic light 111 and a traffic light 113 are located at two intersections, respectively. The first vehicle 102 and the second vehicle 110 are recording visual data with imaging sensors 104 (e.g., cameras). Each of the first vehicle 102 and the second vehicle 110 further includes network interface hardware 106 and an electronic control unit ("ECU") 108 (See FIG. 2). The imaging sensor 104, network interface hardware 106, and ECU 108 are described in greater detail herein with respect to FIG. 2.

The system 100 may also include a first edge computing device 112 that includes network interface hardware 116. The first edge computing device 112 may include a processor 140 (FIG. 2) and one or more memory modules for storing processor-readable instructions as described in greater detail with respect to FIG. 2. In some embodiments, the first edge computing device 112 may be a roadside unit ("RSU"). In some embodiments, the system 100 may include a second edge computing device 114. The second edge computing device 114 may further include network interface hardware 116. In some embodiments, the second edge computing device 114 may be an RSU. The first edge computing device 112 and the second edge computing device 114 may maintain a data connection with one another via the network interface hardware 116 and may be a part of a larger network of computing devices (e.g., a grid computing network). In some embodiments, the first vehicle 102 and the second vehicle 110 establish an edge server connection with one or more of the first edge computing device 112 and the second edge computing device 114 using the network interface hardware 106 of the first vehicle 102 and the second vehicle 110 and the network interface hardware 116 of the first edge computing device 112 and the second edge computing device 114.

The first vehicle 102, the second vehicle 110, the first edge computing device 112, and the second edge computing device 114 may form data connections with one another via their respective network interface hardware 106, 116. The first vehicle 102, the second vehicle 110, the first edge computing device 112, and the second edge computing device 114 may transmit image data and other data over the data connections.

In FIG. 1A, the traffic light 111 has three lights including a red light 105, a yellow light 107, and a green light 109. In this example, the red light 105 of the traffic light 111 is on. The first vehicle 102 may capture images of the traffic light 111 using the imaging sensor 104 and process the images to monitor the light of the traffic light 111. When it is determined that the red light 105 turns off and the green light 109 turns on, the first vehicle 102 transmits the transition time when the red light 105 turns off and the green light 109 turns on to the first edge computing device 112. For example, when the first vehicle 102 determines that the red light 105 turns off and the green light 109 turns on at 12 o'clock 31 minutes 9 seconds, the first vehicle 102 transmits the time stamp of 12 o'clock 31 minutes 9 seconds along with an indication of change from red to green.

Figure 1B:
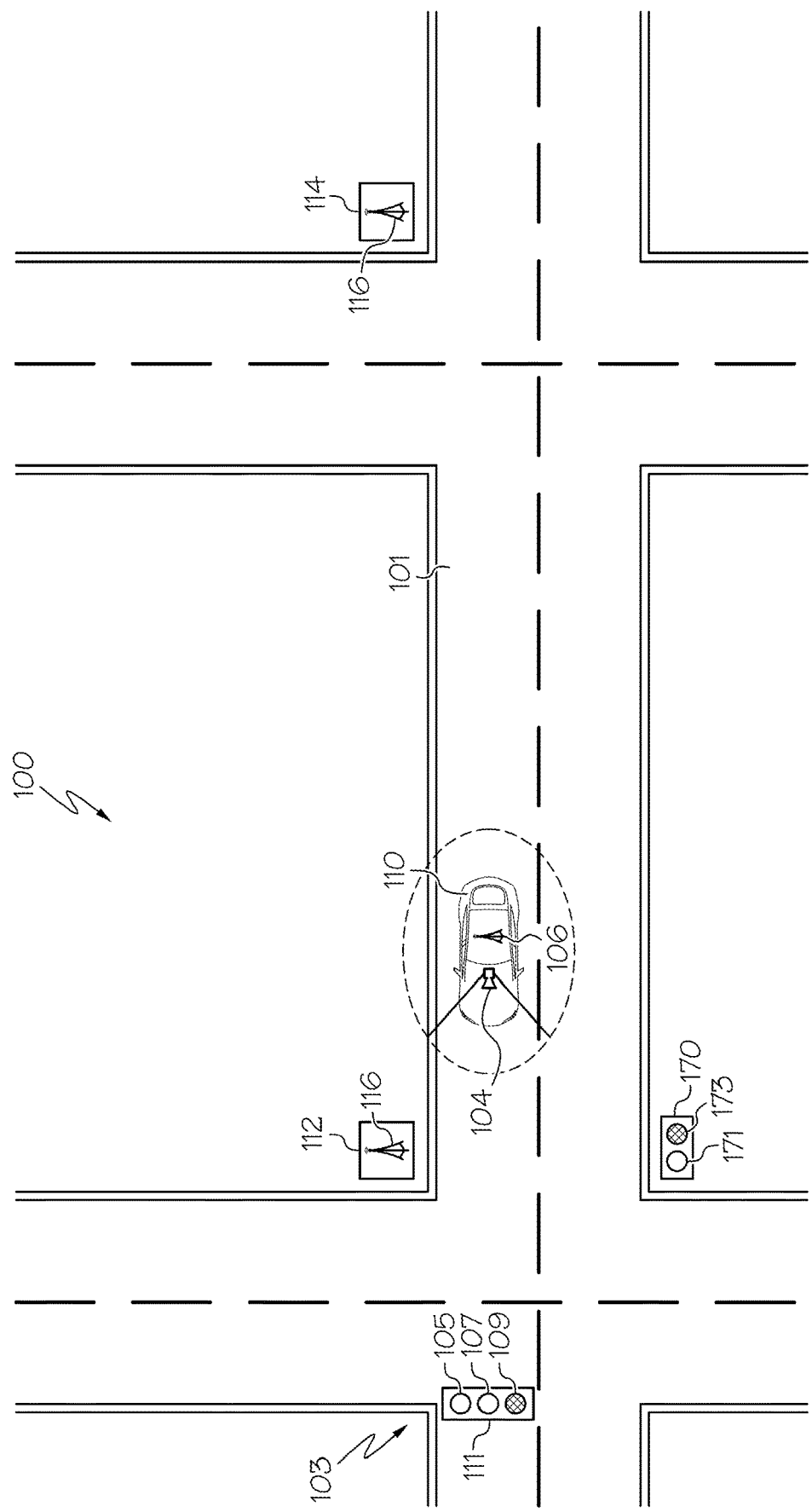
FIG. 1B depicts a scenario in which a traffic light is monitored by imaging sensors of vehicles, according to one or more embodiments shown and described herein.

In FIG. 1B, the first vehicle 102 has passed the intersection 103 and the second vehicle 110 is close to the intersection 103. The green light 109 of the traffic light is turned on. Similar to the first vehicle 102, the second vehicle 110 may capture images of the traffic light 111 using the imaging sensor 104 and process the images to monitor the light of the traffic light 111. The second vehicle 110 may capture the images of traffic light 111 using the imaging sensor 104 and process the images to monitor the light of the traffic light 111. When it is determined that the green light 109 turns off and the yellow light 107 turns on, the second vehicle 110 transmits the transition time when the green light 109 turns off and the yellow light 107 turns on to the first edge computing device 112. For example, when the second vehicle 110 determines that the green light 109 turns off and the yellow light 107 turns on at 12 o'clock 31 minutes 51 seconds, the first vehicle 102 transmits the time stamp of 12 o'clock 31 minutes 51 seconds along with an indication of the change from green to yellow.

In a similar way, the second vehicle 110 may transmit a transition time when the traffic light 111 switches from yellow to red. For example, when the second vehicle 110 determines that the yellow light 107 turns off and the red light 105 turns on at 12 o'clock 31 minutes 55 seconds, the second vehicle 110 transmits the time stamp of 12 o'clock 31 minutes 55 seconds along with an indication of the change from yellow to red.

Referring now to FIGS. 1A, 1B, and 2, additional features and details of the image generating system 100 are described. FIG. 2 is a schematic showing the various systems of each of the first vehicle 102 and the second vehicle 110 of FIG. 1. It is to be understood that the first vehicle 102 and the second vehicle 110 are not limited to the systems and features shown in FIG. 2 and that each may include additional features and systems. As shown, the first vehicle 102 includes a data unit 118 for generating, processing, and transmitting data. The second vehicle 110 may include a second data unit 120 which may be to the same as the data unit 118 of the first vehicle 102 in some embodiments.

The data unit 118 includes the ECU 108, the network interface hardware 106, the imaging sensor 104, a screen 122, a navigation module 124, a speaker 125, and one or more motion sensors 136 that may be connected by a communication path 126. The network interface hardware 106 may connect the first vehicle 102 to external systems via an external connection 128. For example, the network interface hardware 106 may connect the first vehicle 102 to one or more other vehicles directly (e.g., a direct connection to the second vehicle 110) or to an external network such as a cloud network 129.

Still referring to FIGS. 1A, 1B, and 2, the ECU 108 may be any device or combination of components comprising a processor 132 and a non-transitory processor readable memory module 134. The processor 132 may be any device capable of executing a processor-readable instruction set stored in the non-transitory processor readable memory module 134. Accordingly, the processor 132 may be an electric controller, an integrated circuit, a microchip, a computer, or any other computing device. The processor 132 is communicatively coupled to the other components of the data unit 118 by the communication path 126. Accordingly, the communication path 126 may communicatively couple any number of processors 132 with one another, and allow the components coupled to the communication path 126 to operate in a distributed computing environment. Specifically, each of the components may operate as a node that may send and/or receive data. While the embodiment depicted in FIG. 2 includes a single processor 132, other embodiments may include more than one processor.

The non-transitory processor readable memory module 134 is coupled to the communication path 126 and communicatively coupled to the processor 132. The non-transitory processor readable memory module 134 may comprise RAM, ROM, flash memories, hard drives, or any non-transitory memory device capable of storing machine-readable instructions such that the machine-readable instructions can be accessed and executed by the processor 132. The machine-readable instruction set may comprise logic or algorithm(s) written in any programming language of any generation (e.g., 1GL, 2GL, 3GL, 4GL, or 5GL) such as, for example, machine language that may be directly executed by the processor 132, or assembly language, object-oriented programming (OOP), scripting languages, microcode, etc., that may be compiled or assembled into machine readable instructions and stored in the non-transitory processor readable memory module 134. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 134, other embodiments may include more than one memory module.

Still referring to FIGS. 1A, 1B, and 2, one or more imaging sensors 104 are coupled to the communication path 126 and communicatively coupled to the processor 132. While the particular embodiment depicted in FIGS. 1A, 1B, and 2 shows an icon with one imaging sensor and reference is made herein to "imaging sensor" in the singular with respect to the data unit 118, it is to be understood that this is merely a representation and embodiments of the system may include one or more imaging sensors having one or more of the specific characteristics described herein.

The imaging sensor 104 may be any device having an array of sensing devices capable of detecting radiation in an ultraviolet wavelength band, a visible light wavelength band, or an infrared wavelength band. The imaging sensor 104 may have any resolution. In some embodiments, one or more optical components, such as a mirror, fish-eye lens, or any other type of lens may be optically coupled to the imaging sensor 104. In embodiments described herein, the imaging sensor 104 may provide image data to the ECU 108 or another component communicatively coupled to the communication path 126. The image data may include image data of the environment around the first vehicle 102. In some embodiments, for example, in embodiments in which the first vehicle 102 is an autonomous or semi-autonomous vehicle, the imaging sensor 104 may also provide navigation support. That is, data captured by the imaging sensor 104 may be used by the navigation module 124 to autonomously or semi-autonomously navigate the first vehicle 102.

The imaging sensor 104 may operate in the visual and/or infrared spectrum to sense visual and/or infrared light. Additionally, while the particular embodiments described herein are described with respect to hardware for sensing light in the visual and/or infrared spectrum, it is to be understood that other types of sensors are contemplated. For example, the systems described herein could include one or more LIDAR sensors, radar sensors, sonar sensors, or other types of sensors and that such data could be integrated into or supplement the data collection described herein to develop a fuller real-time traffic image.

In operation, the imaging sensor 104 captures image data and communicates the image data to the ECU 108 and/or to other systems communicatively coupled to the communication path 126. The image data may be received by the processor 132, which may process the image data using one or more image processing algorithms. Any known or yet-to-be developed video and image processing algorithms may be applied to the image data in order to identify an item or situation. Example video and image processing algorithms include, but are not limited to, kernel-based tracking (such as, for example, mean-shift tracking) and contour processing algorithms. In general, video and image processing algorithms may detect objects and movement from sequential or individual frames of image data. One or more object recognition algorithms may be applied to the image data to extract objects and determine their relative locations to each other. Any known or yet-to-be-developed object recognition algorithms may be used to extract the objects or even optical characters and images from the image data. Example object recognition algorithms include, but are not limited to, scale-invariant feature transform ("SIFT"), speeded up robust features ("SURF"), and edge-detection algorithms.

The network interface hardware 106 may be coupled to the communication path 126 and communicatively coupled to the ECU 108. The network interface hardware 106 may be any device capable of transmitting and/or receiving data with external vehicles or servers directly or via a network, such as the cloud network 129. Accordingly, network interface hardware 106 can include a communication transceiver for sending and/or receiving any wired or wireless communication. For example, the network interface hardware 106 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 106 may include hardware configured to operate in accordance with the Bluetooth wireless communication protocol and may include a Bluetooth send/receive module for sending and receiving Bluetooth communications.

In some embodiments, the first vehicle 102 may be communicatively coupled to a network such as the cloud network 129. In embodiments, the cloud network 129 may include one or more computer networks (e.g., a personal area network, a local area network, grid computing network, wide area network, etc.), cellular networks, satellite networks and/or a global positioning system and combinations thereof. Accordingly, the first vehicle 102 can be communicatively coupled to the cloud network 129 via wires, via a wide area network, via a local area network, via a personal area network, via a cellular network, via a satellite network, or the like. Suitable local area networks may include wired Ethernet and/or wireless technologies such as, for example, wireless fidelity (Wi-Fi). Suitable personal area networks may include wireless technologies such as, for example, IrDA, Bluetooth, Wireless USB, Z-Wave, ZigBee, and/or other near field communication protocols. Suitable personal area networks may similarly include wired computer buses such as, for example, USB and FireWire. Suitable cellular networks include, but are not limited to, technologies such as LTE, WiMAX, UMTS, CDMA, and GSM.

Referring to FIGS. 1A, 1B, and 2, in embodiments, the first vehicle 102 may connect with one or more external vehicles (e.g., the second vehicle 110) and/or external processing devices (e.g., the first edge computing device 112) via a direct connection. The direct connection may be a vehicle-to-vehicle connection ("V2V connection"). The V2V connection may be established using any suitable wireless communication protocols discussed above. A connection between vehicles may utilize sessions that are time and/or location-based. In embodiments, a connection between vehicles may utilize one or more networks to connect (e.g., the cloud network 129), which may be in lieu of, or in addition to, a direct connection (such as V2V) between the vehicles. By way of non-limiting example, vehicles may function as infrastructure nodes to form a mesh network and connect dynamically/ad-hoc. In this way, vehicles may enter/leave the network at will such that the mesh network may self-organize and self-modify over time. Other non-limiting examples include vehicles forming peer-to-peer networks with other vehicles or utilizing centralized networks that rely upon certain vehicles and/or infrastructure (e.g., the first edge computing device 112). Still other examples include networks using centralized servers and other central computing devices to store and/or relay information between vehicles.

In embodiments, the data unit 118 may include one or more motion sensors 136 for detecting and measuring motion and changes in motion of the first vehicle 102. Each of the one or more motion sensors 136 is coupled to the communication path 126 and communicatively coupled to the one or more processors 132. The motion sensors 136 may include inertial measurement units. Each of the one or more motion sensors 136 may include one or more accelerometers and one or more gyroscopes. Each of the one or more motion sensors 136 transforms sensed physical movement of the first vehicle 102 into a signal indicative of an orientation, a rotation, a velocity, or an acceleration of the first vehicle 102.

In embodiments, the data unit 118 includes a screen 122 for providing visual output such as, for example, maps, navigation, entertainment, seat arrangements or a combination thereof. The screen 122 may be located on the head unit of the vehicle such that a driver of the vehicle may see the screen 122 while seated in the driver seat. The screen 122 is coupled to the communication path 126. Accordingly, the communication path 126 communicatively couples the screen 122 to other modules of the data unit 118. The screen 122 may include any medium capable of transmitting an optical output such as, for example, a cathode ray tube, a light emitting diode (LED) display, an organic light emitting diode (OLED) display, a liquid crystal display, a plasma display, or the like. In embodiments, the screen 122 may be a touchscreen that, in addition to visually displaying information, detects the presence and location of a tactile input upon a surface of or adjacent to the screen 122.

In embodiments, the data unit 118 may include the navigation module 124. The navigation module 124 may be configured to obtain and update positional information of the first vehicle 102 and to display such information to one or more users of the first vehicle 102. The navigation module 124 may be able to obtain and update positional information based on geographical coordinates (e.g., latitudes and longitudes), or via electronic navigation where the navigation module 124 electronically receives positional information through satellites. In certain embodiments, the navigation module 124 may include a GPS system.

In embodiments, the data unit 118 includes the speaker 125 for transforming data signals into mechanical vibrations, such as in order to output audible prompts or audible information to a driver of the vehicle. The speaker 125 is coupled to the communication path 126 and communicatively coupled to the one or more processors 132.

The components of the second data unit 120 of the second vehicle 110 may be exactly the same as the components of the data unit 118 of the first vehicle 102 in some embodiments.

Referring to FIGS. 1A, 1B, and 2, the first edge computing device 112 may include the network interface hardware 116 which may be communicatively coupled to a control unit 138 including a processor 140 and a non-transitory processor readable memory module 142 via a communication path 127.

The network interface hardware 116 may be coupled to the communication path 127 and communicatively coupled to the control unit 138. The network interface hardware 116 may be any device capable of transmitting and/or receiving data with external vehicles or servers directly or via a network, such as the cloud network 129. Accordingly, network interface hardware 116 can include a communication transceiver for sending and/or receiving any wired or wireless communication. For example, the network interface hardware 116 may include an antenna, a modem, LAN port, Wi-Fi card, WiMax card, mobile communications hardware, near-field communication hardware, satellite communication hardware and/or any wired or wireless hardware for communicating with other networks and/or devices. In embodiments, network interface hardware 116 may include hardware configured to operate in accordance with the Bluetooth wireless communication protocol and may include a Bluetooth send/receive module for sending and receiving Bluetooth communications.

The control unit 138 may include the processor 140 and the non-transitory processor readable memory module 142. The processor 140 may be any device capable of executing the processor-readable instruction set stored in the non-transitory processor readable memory module 142. Accordingly, the processor 140 may be an electric controller, an integrated circuit, a microchip, a computer, or any other computing device. The processor 140 is communicatively coupled to the communication path 127. Accordingly, the communication path 127 may communicatively couple any number of processors 140 with one another, and allow the components coupled to the communication path 127 to operate in a distributed computing environment. Specifically, each of the components may operate as a node that may send and/or receive data. While the embodiment depicted in FIG. 2 includes a single processor 140, other embodiments may include more than one processor.

The non-transitory processor readable memory module 142 is coupled to the communication path 127 and communicatively coupled to the processor 140. The non-transitory processor readable memory module 142 may comprise RAM, ROM, flash memories, hard drives, or any non-transitory memory device capable of storing machine-readable instructions such that the machine-readable instructions can be accessed and executed by the processor 140. The machine-readable instruction set may comprise logic or algorithm(s) written in any programming language of any generation (e.g., 1GL, 2GL, 3GL, 4GL, or 5GL) such as, for example, machine language that may be directly executed by the processor 140, or assembly language, object-oriented programming (OOP), scripting languages, microcode, etc., that may be compiled or assembled into machine readable instructions and stored in the non-transitory processor readable memory module 142. Alternatively, the machine-readable instruction set may be written in a hardware description language (HDL), such as logic implemented via either a field-programmable gate array (FPGA) configuration or an application-specific integrated circuit (ASIC), or their equivalents. Accordingly, the functionality described herein may be implemented in any conventional computer programming language, as pre-programmed hardware elements, or as a combination of hardware and software components. While the embodiment depicted in FIG. 2 includes a single non-transitory processor readable memory module 142, other embodiments may include more than one memory module.

Figure 3:
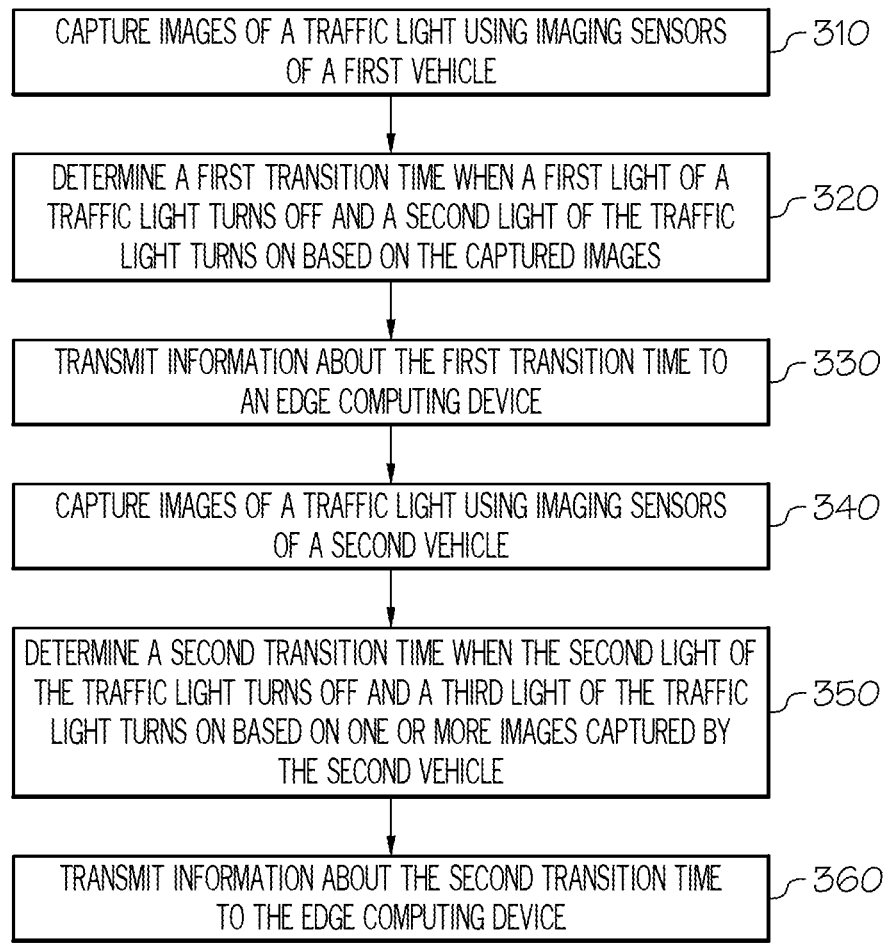
FIG. 3 depicts a flow chart showing one embodiment of a method of monitoring traffic lights using imaging sensors of vehicles, according to one or more embodiments shown and described herein.

FIG. 3 depicts a flow chart for monitoring a traffic light, according to embodiments shown and described herein.

In block 310, a first vehicle captures images of a traffic light using its imaging sensor. In embodiments, the first vehicle 102 captures images of the traffic light 111 using its imaging sensor 104 as shown in FIG. 1A. The processor 132 of the first vehicle 102 may process the captured images to identify which light of the traffic light 111 is on. In the embodiment, the red light 105 of the traffic light 111 is on, and the processor 132 of the first vehicle 102 may process the captured images to identify that the red light 105 is on.

In block 320, the first vehicle determines a first transition time when a first light of a traffic light turns off and a second light of the traffic light turns on based on the captured images. In embodiments, the first vehicle 102 continuously captures images of the traffic light 111, and determines the first transition time when the red light 105 of the traffic light 111 turns off and the green light 109 of the traffic light 111 turns on by processing the captured images. For example, the first vehicle 102 determines that the first transition time (i.e., when the green light 109 turns on) is 12 o'clock 31 minutes 9 seconds.

In block 330, the first vehicle transmits information about the first transition time to an edge computing device. In embodiments, the first vehicle 102 transmits the first transition time of 12 o'clock 31 minutes 9 seconds to the first edge computing device 112. In embodiments, the first vehicle 102 transmits the first transition time along with an indication of a color being turned off and a color being turn on. For example, the first vehicle 102 transmits an indication that the red light turns off and the green light turns on to the first edge computing device 112 along with the first transition time. In some embodiments, the first vehicle 102 may also transmit information about the location of the traffic light 111. For example, the first vehicle 102 may determine the current location of the first vehicle 102 using the navigation module 124. Based on the current location of the first vehicle 102, the driving direction of the first vehicle 102 and the captured image of the traffic light 111, the first vehicle 102 determines the location of the traffic light 111. In some embodiments, the first vehicle 102 transmits the location of the intersection 103 where the traffic light 111 is located. For example, the first vehicle 102 may determine the current location of the first vehicle 102 using the navigation module 124 and determine a driving direction of the first vehicle 102 using the motion sensor 136. Based on the current location of the first vehicle 102 and the driving direction of the first vehicle 102, the first vehicle 102 determines the location of the intersection 103.

In block 340, a second vehicle captures images of a traffic light using its imaging sensor. In embodiments, the second vehicle 110 captures images of the traffic light 111 using its imaging sensor 104 as shown in FIG. 1B. The processor 132 of the second vehicle 110 may process the captured images to identify which light of the traffic light 111 is on. In the embodiment, the green light 109 of the traffic light 111 is on, and the processor 132 of the second vehicle 110 may process the captured images to identify that the green light 109 is on.

In block 350, the second vehicle determines a second transition time when the second light of a traffic light turns off and a third light of the traffic light turns on based on one or more images captured by the second vehicle. In embodiments, the second vehicle 110 continuously captures images of the traffic light 111, and determines the second transition time when the green light 109 of the traffic light 111 turns off and the yellow light 107 of the traffic light 111 turns on by processing the captured images. For example, the second vehicle 110 determines that the second transition time (i.e., when the yellow light 107 turns on) is 12 o'clock 31 minutes 51 seconds.

In block 360, the second vehicle transmits information about the second transition time to the edge computing device. In embodiments, the second vehicle 110 transmits the second transition time of 12 o'clock 31 minutes 51 seconds to the first edge computing device 112. In embodiments, the first vehicle 102 transmits the second transition time along with an indication of a color being turned off and a color being turn on. For example, the second vehicle 110 transmits an indication that the green light turns off and the yellow light turns on to the first edge computing device 112 along with the second transition time. In some embodiments, the second vehicle 110 may also transmit information about the location of the traffic light 111. For example, the second vehicle 110 may determine the current location of the second vehicle 110 using the navigation module 124. Based on the current location of the second vehicle 110 and the captured image of the traffic light 111, the second vehicle 110 determines the location of the traffic light 111. In some embodiments, the second vehicle 110 transmits the location of the intersection 103 where the traffic light 111 is located. For example, the second vehicle 110 may determine the current location of the second vehicle 110 using the navigation module 124 and determine a driving direction of the second vehicle 110 using the motion sensor 136. Based on the current location of the second vehicle 110 and the driving direction of the second vehicle 110, the second vehicle 110 determines the location of the intersection 103.

The first edge computing device 112 may calculate the duration where the green light 109 is on (i.e., green time) based on the first transition time and the second transition time. For example, the first edge computing device 112 may calculate the green time based on the difference between the second transition time and the first transition time. In the example, the green time is 42 seconds, i.e., time difference between 12 o'clock 31 minutes 51 seconds and 12 o'clock 31 minutes and 9 seconds. The first edge computing device 112 may transmit an alert to other vehicles coming toward the traffic light 111 based on the calculated green time, which will be described in detail with reference to FIGS. 5 and 6 below.

In some embodiments, the second vehicle determines a third transition time when the third light of a traffic light turns off and the first light of the traffic light turns on based on one or more images captured by the second vehicle. In embodiments, the second vehicle 110 continuously captures images of the traffic light 111, and determines the third transition time when the yellow light 107 of the traffic light 111 turns off and the red light 105 of the traffic light 111 turns on by processing the captured images. For example, the second vehicle 110 determines that the third transition time (i.e., when the red light 105 turns on) is 12 o'clock 31 minutes 55 seconds. The first edge computing device 112 may calculate the duration where the yellow light 107 is on (i.e., yellow time) based on the second transition time and the third transition time. For example, the first edge computing device 112 may calculate the yellow time based on the difference between the third transition time and the second transition time. In the example, the yellow time is 4 seconds, i.e., time difference between 12 o'clock 31 minutes 55 seconds and 12 o'clock 31 minutes and 51 seconds. The first edge computing device 112 may transmit an alert to other vehicles coming toward the traffic light 111 based on the calculated yellow time, which will be described in detail with reference to FIGS. 5 and 6 below.

Figure 4A:
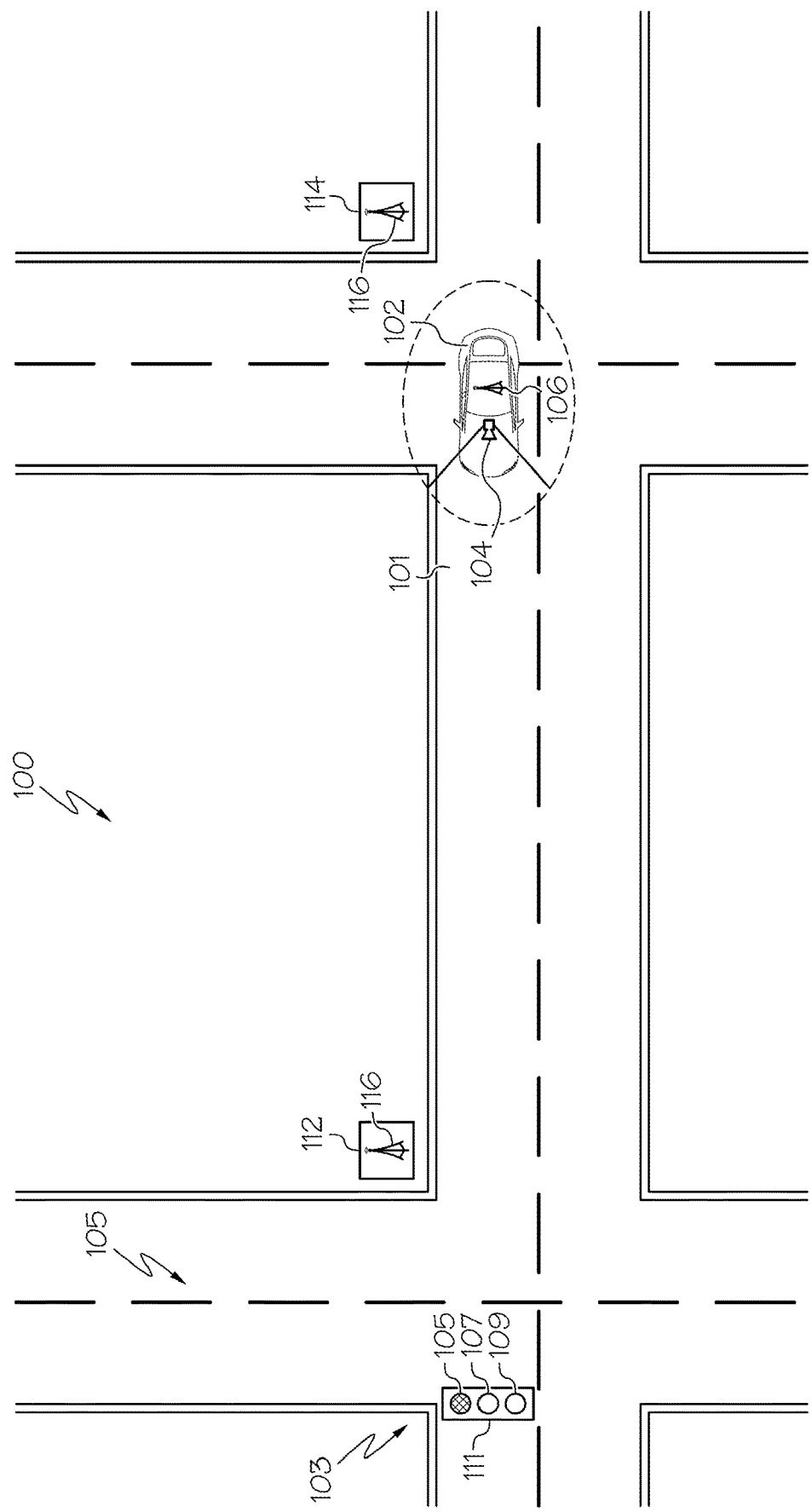
FIG. 4A depicts a scenario in which a traffic light is monitored by the imaging sensor of a vehicle, according to one or more embodiments shown and described herein.
Figure 4B:
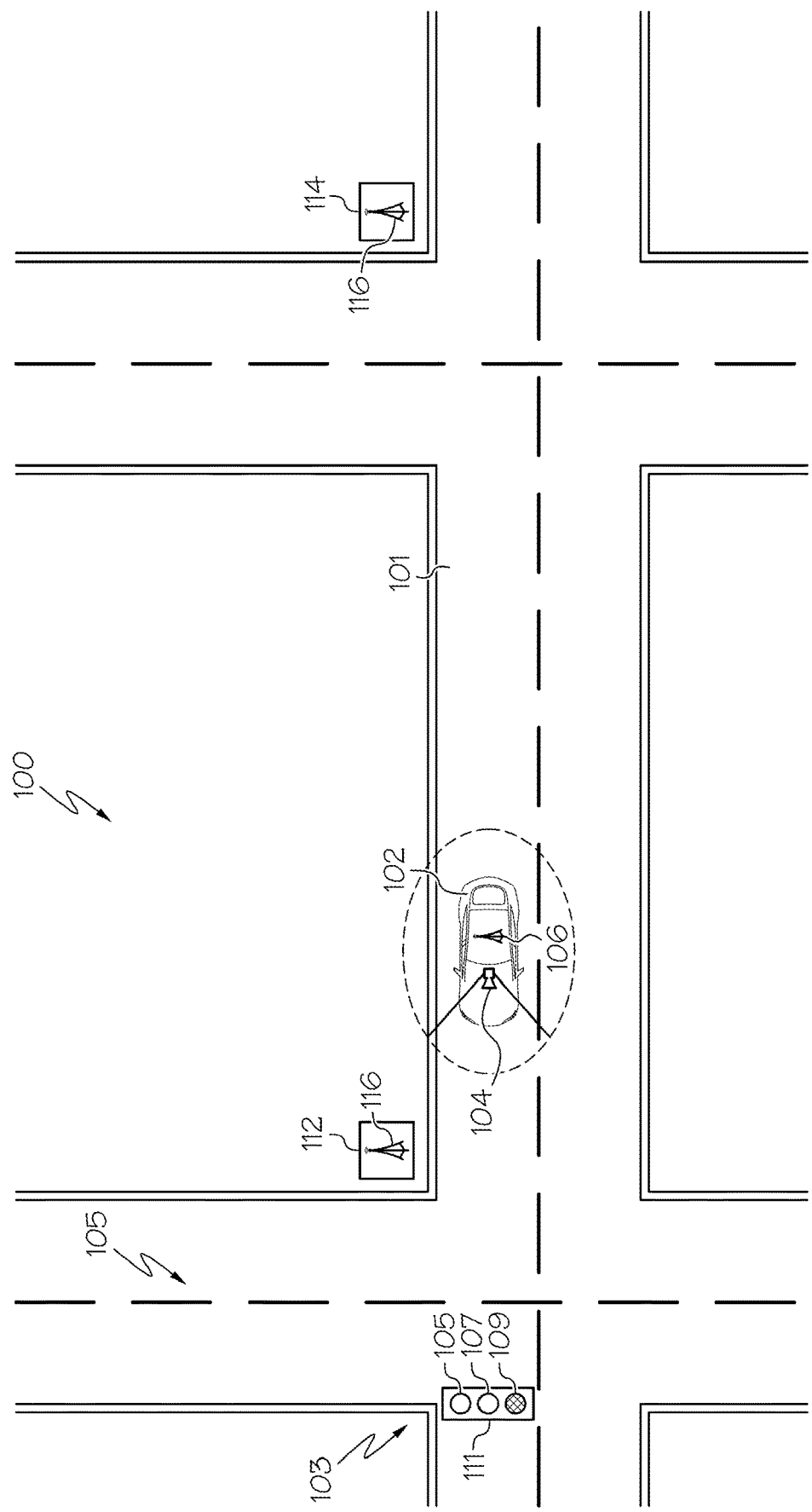
FIG. 4B depicts a scenario in which a traffic light is monitored by the imaging sensor of the vehicle, according to one or more embodiments shown and described herein.

While FIGS. 1A, 1B, and 3 depicts an embodiment where the green time is calculated based on the first transition time and the second transition time communicated from the first vehicle and the second vehicle, respectively, the green time may be calculated based on the first transition time and the second transition time communicated from a single vehicle as shown in FIGS. 4A and 4B.

In FIG. 4A, the first vehicle 102 is located about 0.1 miles from the traffic light 111. In embodiments, the first vehicle 102 captures images of the traffic light 111 using its imaging sensor 104 as shown in FIG. 4A. The processor 132 of the first vehicle 102 may process the captured images to identify which light of the traffic light 111 is on. In the embodiment shown in FIG. 4A, the red light 105 of the traffic light 111 is on, and the processor 132 of the first vehicle 102 may process the captured images to identify that the red light 105 is on. Then, the first vehicle 102 determines the first transition time when the red light 105 of the traffic light 111 turns off and the green light 109 of the traffic light 111 turns on by processing the captured images. For example, the first vehicle 102 determines that the first transition time (i.e., when the green light 109 turns on) is 9 o'clock 25 minutes 5 seconds. The first vehicle 102 transmits the first transition time of 9 o'clock 25 minutes 5 seconds to the first edge computing device 112 along with an indication of a color being turned off and a color being turn on (e.g., the red light 105 turns off and the green light 109 turns on). The first vehicle 102 may also transmit information about the location of the traffic light 111 and/or the location of the intersection 103.

In FIG. 4B, the first vehicle 102 is close to the traffic light 111. For example, the first vehicle 102 is driving toward the traffic light 111 and is now only 20 feet from the traffic light 111. The first vehicle 102 captures images of the traffic light 111 using its imaging sensor 104 as shown in FIG. 4B. The processor 132 of the first vehicle 102 may process the captured images to identify which light of the traffic light 111 is on. In the embodiment, the green light 109 of the traffic light 111 is on, and the processor 132 of the first vehicle 102 may process the captured images to identify that the green light 109 is on. The first vehicle 102 continuously captures images of the traffic light 111, and determines the second transition time when the green light 109 of the traffic light 111 turns off and the yellow light 107 of the traffic light 111 turns on by processing the captured images. For example, the first vehicle 102 determines that the second transition time (i.e., when the yellow light 107 turns on) is 9 o'clock 25 minutes 49 seconds. Then, the first vehicle 102 transmits the second transition time of 9 o'clock 25 minutes 49 seconds to the first edge computing device 112 along with an indication of a color being turned off and a color being turn on (e.g., the green light 109 turns off and the yellow light 107 turns on). The first vehicle 102 may also transmit information about the location of the traffic light 111 and/or the location of the intersection 103 along with the second transition time. In a similar way, the first vehicle 102 may determine a third transition time when the third light of a traffic light turns off and the first light of the traffic light turns on based on one or more images captured by the first vehicle 102. In embodiments, the first vehicle 102 continuously captures images of the traffic light 111, and determines the third transition time when the yellow light 107 of the traffic light 111 turns off and the red light 105 of the traffic light 111 turns on by processing the captured images.

While the figures depict a traffic light have three color lights, the traffic light may have more than three or less than three color lights. For example, the traffic light may have two colors: a red light and a green light. The first transition time may be when the red light turns off and the green light turns on. The second transition time may be when the green light turns off and the red light turns on. As another example, the traffic light may have four color lights: a red light, a yellow light, a green left turn light, and a green light. The first transition time may be when the red light turns off and the green left turn light turns on. The second transition time may be when the green left turn light turns off and the green light turns on. A third second transition time may be when the green light turns off and the yellow light turns on. A fourth transition time may be when the yellow light turns off and the red light turns on. Based on the first transition time, the second transition time, the third transition time, and the fourth transition time, the first edge computing device 112 may calculate a green left turn time (i.e., a duration while the green left turn light is on), the green time, and the yellow time.

In some embodiments, the first vehicle 102 and/or the second vehicle 110 capture images of a pedestrian traffic light 170, for example, as shown in FIGS. 1A and 1B. The pedestrian traffic light 170 includes a do not walk light 171 and a walk light 173. The first vehicle 102 and/or the second vehicle 110 may calculate a first transition time when the do not walk light 171 of the pedestrian traffic light 170 turns off and the walk light 173 of the pedestrian traffic light 170 turns on. The first vehicle 102 and/or the second vehicle 110 may calculate a second transition time when the walk light 173 of the pedestrian traffic light 170 turns off and the do not walk light 171 of the pedestrian traffic light 170 turns on. The first vehicle 102 and/or the second vehicle 110 transmits the first transition time and the second transition time to the first edge computing device 112. The first edge computing device 112 may calculate a walk time of the pedestrian traffic light 170 based on the first transition time and the second transition time. The first edge computing device may communicate the walk time to other vehicles or mobile devices within a predetermined area. For example, a pedestrian at the intersection may receive information about the walk time of the pedestrian traffic light 170 or when the pedestrian traffic light 170 will switch, through her mobile device from the first edge computing device 112.

Figure 5:
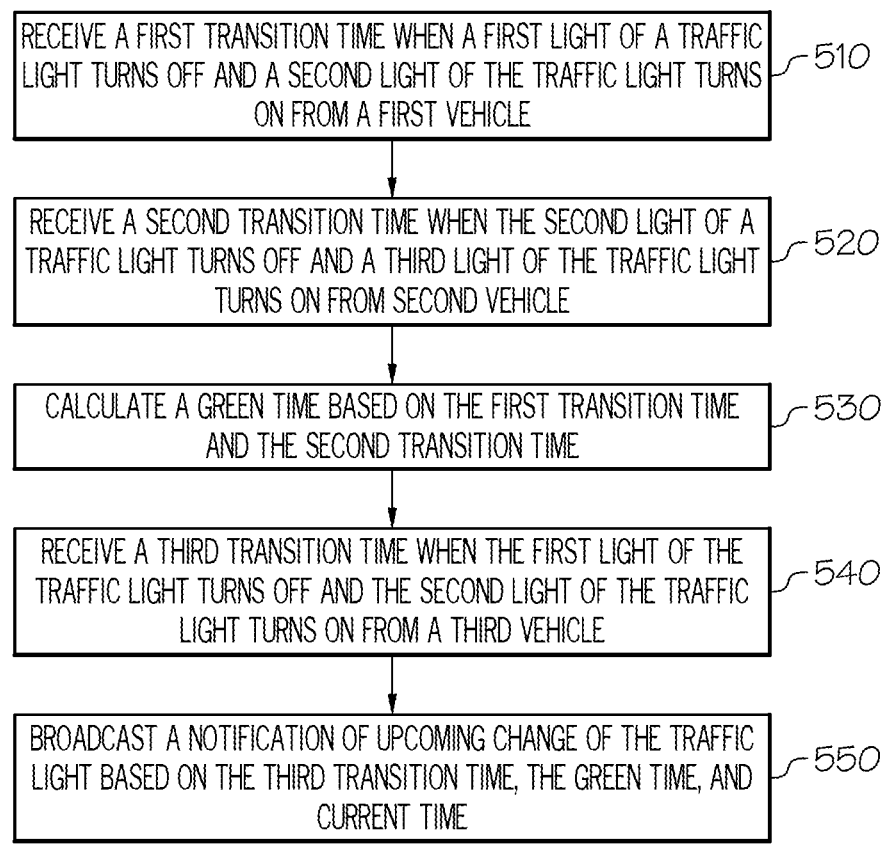
FIG. 5 depicts a flow chart showing one embodiment of a method of transmitting a notification of an upcoming traffic light change, according to one or more embodiments shown and described herein.

FIG. 5 depicts a flow chart for alerting an upcoming traffic light change, according to one or more embodiments shown and described herein. In block 510, a first edge computing device receives a first transition time when a first light of a traffic light turns off and a second light of the traffic light turns on from a first vehicle. In embodiments, as depicted in FIG. 1A, the first edge computing device 112 receives, from the first vehicle 102, the first transition time when the red light 105 turns off and the green light 109 turns on. For example, the first transition time is 12 o'clock 31 minutes 9 seconds.

In block 520, the first edge computing device receives a second transition time when the second light of a traffic light turns off and a third light of the traffic light turns on from a second vehicle. In embodiments, as depicted in FIG. 1A, the first edge computing device 112 receives, from the second vehicle 110, the second transition time when the green light 109 turns off and the yellow light 107 turns on. For example, the second transition time is 12 o'clock 31 minutes 51 seconds. In some embodiments, the first edge computing device 112 receives the second transition time from the first vehicle 102 instead of the second vehicle 110.

In block 530, the first edge computing device calculates a green time based on the first transition time and the second transition time. For example, the first edge computing device 112 calculates a green time based on the difference between the second transition time and the first transition time. The green time, in this example, is 42 seconds.

In block 540, the first edge computing device receives a third transition time when the first light of the traffic light turns off and the second light of the traffic light turns on from a third vehicle. By referring to FIG. 6, the first edge computing device 112 receives a third transition time when the red light 105 turns off and the green light 109 turns on from the third vehicle 610. For example, the third transition time is 12 o'clock 35 minutes 5 seconds.

In block 550, the first edge computing device broadcasts a notification of upcoming change of the traffic light based on the third transition time, the green time, and current time. For example, the current time is 12 o'clock 35 minutes 26 seconds. The first edge computing device 112 may store the green time as 42 seconds that is calculated in block 530. The first edge computing device 112 may determine that the green light 109 will turn off in 21 seconds based on the third transition time of 12 o'clock 35 minutes 5 seconds, the green time of 42 seconds, and the current time of 12 o'clock 35 minutes 26 seconds. Then, the first edge computing device broadcasts a notification that the green light 109 will turn off in 21 seconds. In embodiments, the first edge computing device 112 may broadcast the notification to vehicles within a predetermined distance from the first edge computing device 112.

Figure 6:
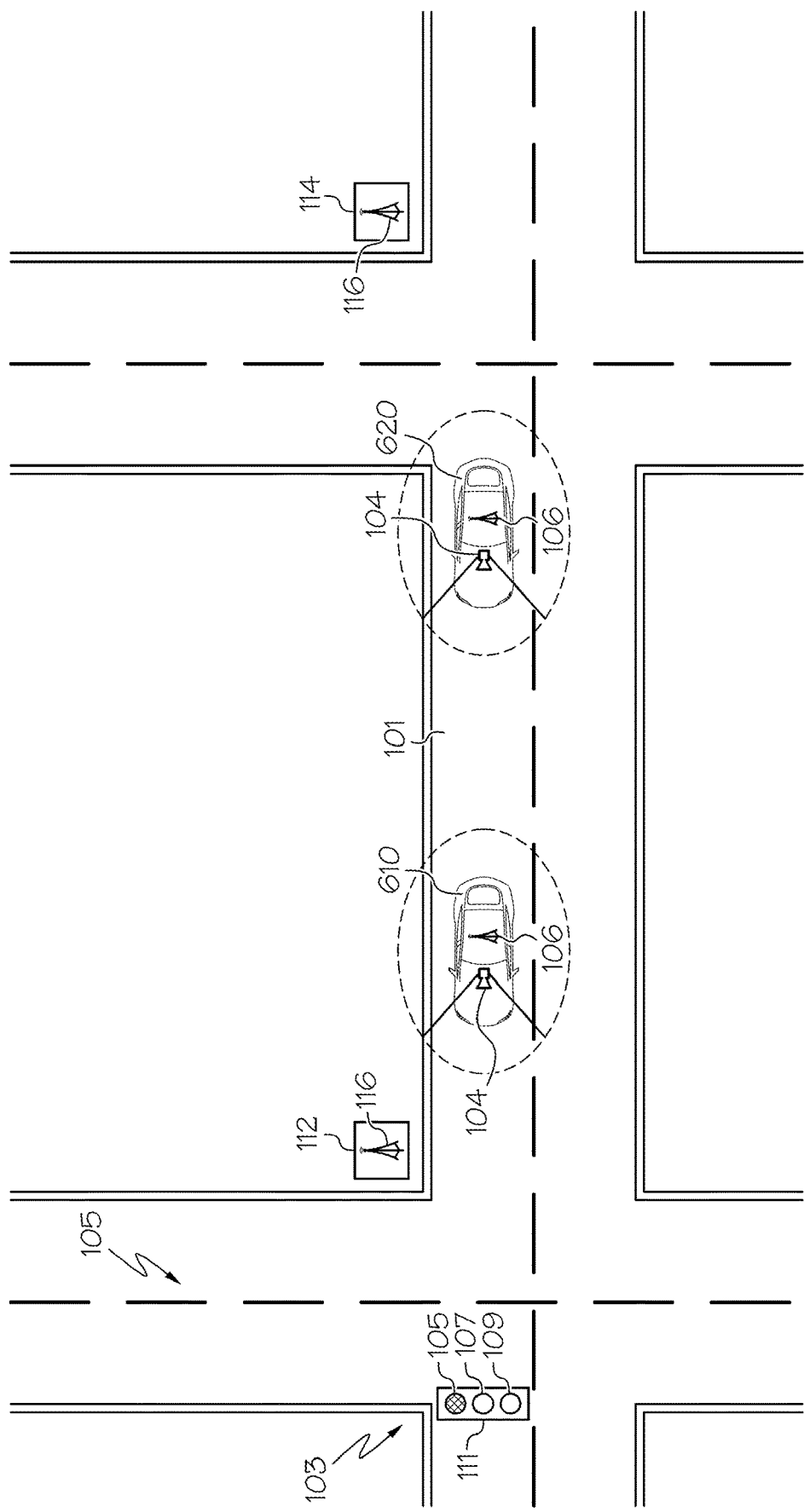
FIG. 6 depicts a scenario in which an edge computing device transmits a notification to vehicles that the traffic light is to be changed, according to one or more embodiments shown and described herein.

The third vehicle 610 and a fourth vehicle 620 in FIG. 6 may receive the notification from the first edge computing device 112. In response to receiving the notification, the third vehicle 610 and the fourth vehicle 620 may determine an arrival time to the intersection. For example, each of the third vehicle 610 and the fourth vehicle 620 may determine the arrival time at the intersection 103 based on the vehicle speed and the distance between the vehicle and the intersection 103. The vehicle speed may be determined by the one or more motion sensors 136. The distance may be determined based on the current location of the vehicle measured by the navigation module 124 and the location of the intersection 103.

In embodiments, if the arrival time is after the green light 109 turns off, the vehicle may provide a notification to a driver. In this example, the third vehicle 610 will arrive at the intersection 103 in 5 seconds, and the fourth vehicle will arrive at the intersection 103 in 25 seconds. The third vehicle 610 may not provide a notification to the driver of the third vehicle 610 because the third vehicle 610 will cross the intersection before the green light 109 turns off. The fourth vehicle 620 may provide a notification to the driver of the fourth vehicle 620 because the green light 109 will turn off before the fourth vehicle 620 reaches the intersection 103.

The notification may be different depending on the estimated arrival time. For example, if the green light turns off more than five seconds before the arrival time at the intersection 103, the vehicle may provide a caution to the driver of the vehicle. If the green light turns off less than five seconds before the arrival time at the intersection, the vehicle may provide a warning to the driver of the vehicle. In this example, the green light will turn off less than five seconds before the fourth vehicle's arrival time at the intersection, and the fourth vehicle may provide a warning to the driver. For example, the warning may be displayed on the screen 122 of the vehicle. As another example, the warning may be an audible output through the speaker 125.

It should now be understood that a traffic light is monitored by multiple vehicles in real time. An edge computing device receives a first transition time when a first light of a traffic light turns off and a second light of the traffic light turns on from a vehicle, and receive a second transition time when the second light of the traffic light turns off and a third light of the traffic light turns on from a vehicle. The edge computing device calculates a period for the second light being on based on the first transition time and the second transition time. Based the calculated period (e.g., a green time), the edge computing device transmits, to vehicles within a predetermined distance, a message regarding upcoming change of the traffic light. According to the present disclosure, traffic light change timing information is shared among vehicles via edge computing devices. Vehicles that receive the information may prepare to react in advance of the traffic light change.

It is noted that the terms "substantially" and "about" may be utilized herein to represent the inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A traffic light monitoring system comprising:
   a vehicle configured to:
      identify a traffic light based on images captured by an imaging sensor of the vehicle;
      determine a first transition time when a first light of a traffic light turns off and a second light of the traffic light turns on based on the images;
      determine a second transition time when the second light of the traffic light turns off and a third light of the traffic light turns on based on the images; and
      transmit information about the first transition time and the second transition time to an edge computing device; and
   the edge computing device configured to:

calculate a period for the second light being on based on the first transition time and the second transition time;

receive another transition time when the first light turns off and the second light turns on from another vehicle, the another transition time being after the first transition time; and broadcast a notification of an upcoming change of the second light based on the another transition time, the period, and a current time.

2. The traffic light monitoring system of claim 1, wherein the imaging sensor is a forward facing camera of the vehicle.

3. The traffic light monitoring system of claim 1, wherein the first light is a red light, the second light is a green light, and the third light is a yellow light.

4. The traffic light monitoring system of claim 1, wherein the vehicle is further configured to:

determine a third transition time when the third light of the traffic light turns off and the first light of the traffic light turns on based on the images; and transmit information about the third transition time to the edge computing device.

5. The traffic light monitoring system of claim 4, wherein the edge computing device is configured to:

determine a period for the third light being on based on the second transition time and the third transition time.

6. The traffic light monitoring system of claim 1, wherein:

the vehicle comprises a navigation module, and the vehicle is configured to:

determine a current location of the vehicle based on a signal from the navigation module;

determine a location of the traffic light based on the current location of the vehicle and the images; and transmit the location of the traffic light to the edge computing device.

7. The traffic light monitoring system of claim 1, wherein the vehicle is configured to:

transmit, to the edge computing device, information about the first light being turned off and the second light being turned on along with the first transition time; and transmit, to the edge computing device, information about the second light being turned off and the third light being turned on along with the second transition time.

8. The traffic light monitoring system of claim 1, wherein the vehicle is configured to:

determine a third transition time when the third light of the traffic light turns off and a fourth light of the traffic light turns on based on the images;

determine a fourth transition time when the fourth light of the traffic light turns off and the first light of the traffic light turns on based on the images; and transmit information about the third transition time and the fourth transition time.

9. The traffic light monitoring system of claim 8, wherein the first light is a red light, the second light is a left-turn light, the third light is a green light, and the fourth light is a yellow light.

10. The traffic light monitoring system of claim 8, wherein the first light is a red light, the second light is a right-turn light, the third light is a green light, and the fourth light is a yellow light.

11. The traffic light monitoring system of claim 1, wherein the edge computing device is a road side unit.

12. The traffic light monitoring system of claim 1, wherein the vehicle is an autonomous vehicle.

13. An edge computing device configured to:

receive a first transition time when a first light of a traffic light turns off and a second light of the traffic light turns on from a vehicle;

receive a second transition time when the second light of the traffic light turns off and a third light of the traffic light turns on from the vehicle;

calculate a period for the second light being on based on the first transition time and the second transition time;

receive another transition time when the first light turns off and the second light turns on from another vehicle, the another transition time being after the first transition time; and broadcast a notification of an upcoming change of the second light based on the another transition time, the period, and a current time.

14. The edge computing device of claim 13, further configured to:

determine a timing when the second light turns off after the third transition time based on the third transition time and the period; and broadcast the timing to vehicles within a predetermined distance of the edge computing device.

15. The edge computing device of claim 13, further configured to:

receive a third transition time when the third light of the traffic light turns off and the first light of the traffic light turns on from the vehicle; and calculate a period for the third light being on based on the second transition time and the third transition time.

16. The edge computing device of claim 13, wherein the first light is a red light, the second light is a green light, and the third light is a yellow light.

17. An edge computing device configured to:

receive a first transition time when a first light of a traffic light turns off and a second light of the traffic light turns on from a first vehicle;

receive a second transition time when the second light of the traffic light turns off and the first light of the traffic light turns on from a second vehicle;

calculate a period for the second light being on based on the first transition time and the second transition time;

receive a third transition time when the first light turns off and the second light turns on from a third vehicle, the third transition time being after the first transition time; and broadcast a notification of an upcoming change of the second light based on the third transition time, the period, and a current time.

18. The edge computing device of claim 17, wherein the first light is a red light and the second light is a green light.

19. The edge computing device of claim 17, wherein the traffic light is a pedestrian traffic light.

* * * * *